United States Patent
Hada et al.

(10) Patent No.: US 11,948,225 B2
(45) Date of Patent: Apr. 2, 2024

(54) IMAGE PROCESSING APPARATUS

(71) Applicants: Kabushiki Kaisha Toshiba, Tokyo (JP); Toshiba Electronic Devices & Storage Corporation, Tokyo (JP)

(72) Inventors: Ryuji Hada, Yokohama Kanagawa (JP); Atsushi Masuda, Yokohama Kanagawaa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 480 days.

(21) Appl. No.: 17/200,461

(22) Filed: Mar. 12, 2021

(65) Prior Publication Data

US 2022/0092726 A1    Mar. 24, 2022

(30) Foreign Application Priority Data

Sep. 18, 2020  (JP) ................................ 2020-157793

(51) Int. Cl.
 *G06K 9/00* (2022.01)
 *G06T 1/20* (2006.01)
 *G06T 1/60* (2006.01)

(52) U.S. Cl.
 CPC . *G06T 1/60* (2013.01); *G06T 1/20* (2013.01)

(58) Field of Classification Search
 CPC .................................... G06T 1/60; G06T 1/20
 See application file for complete search history.

(56) References Cited

U.S. PATENT DOCUMENTS

| | | | |
|---|---|---|---|
| 7,027,085 B2 | 4/2006 | Watanabe | |
| 7,969,473 B2 | 6/2011 | Kotoda | |
| 8,896,668 B2 | 11/2014 | Goma et al. | |
| 9,001,227 B2 | 4/2015 | Aleksic et al. | |
| 10,652,487 B2 | 5/2020 | Hada | |
| 10,659,746 B2 | 5/2020 | Hada et al. | |
| 2011/0024355 A1 | 2/2011 | Mansouri et al. | |
| 2011/0242342 A1* | 10/2011 | Goma | H04N 23/665 348/E5.024 |
| 2013/0235149 A1 | 9/2013 | Tanaka et al. | |
| 2013/0321673 A1* | 12/2013 | Lim | H04N 17/002 348/241 |
| 2020/0092467 A1 | 3/2020 | Hada et al. | |

(Continued)

FOREIGN PATENT DOCUMENTS

| | | |
|---|---|---|
| EP | 2632151 A3 | 6/2015 |
| JP | 2003-158659 A | 5/2003 |

(Continued)

*Primary Examiner* — Xin Jia
(74) *Attorney, Agent, or Firm* — Allen & Overy LLP

(57) ABSTRACT

An image processing apparatus in an embodiment includes a FIFO memory, a plurality of line buffers, an image processing circuit, and a control circuit. The plurality of line buffers store data inputted from a plurality of cameras. The image processing circuit performs predetermined image processing on the data stored in the plurality of line buffers. The control circuit performs control, according to an output control signal, such that output of data to the plurality of line buffers is stopped and the data stopped from being outputted is stored in the FIFO memory.

9 Claims, 4 Drawing Sheets

(56) References Cited

U.S. PATENT DOCUMENTS

2020/0294208 A1 9/2020 Hada
2021/0067688 A1 3/2021 Hada

FOREIGN PATENT DOCUMENTS

| | | |
|---|---|---|
| JP | 3586131 B2 | 11/2004 |
| JP | 2007-180635 A | 7/2007 |
| JP | 2007-208781 A | 8/2007 |
| JP | 2013-55541 A | 3/2013 |
| JP | 2013-524688 A | 6/2013 |
| JP | 2013-201753 A | 10/2013 |
| JP | 2013-214952 A | 10/2013 |
| JP | 2015-80149 A | 4/2015 |
| JP | 2016-40870 A | 3/2016 |
| JP | 5930276 B2 | 6/2016 |
| JP | 2018-124968 A | 8/2018 |
| JP | 2019-160063 A | 9/2019 |
| JP | 2020-046817 A | 3/2020 |
| JP | 2020-149473 A | 9/2020 |
| JP | 2021-034997 A | 3/2021 |

* cited by examiner

FIG. 4

|  | NUMBER OF IMAGE PROCESSING CIRCUITS | LOGIC CIRCUIT AREA | MEMORY CAPACITY | CHIP AREA | POWER CONSUMPTION |
|---|---|---|---|---|---|
| COMPARISON EXAMPLE (NON-TIME DIVISION) | 1 | 1 | 1 | 1 | 1 |
| PRESENT EMBODIMENT (TIME DIVISION) | 0.5 | 0.5 | 1 | 0.81 | 0.83 |

IMAGE PROCESSING APPARATUS

CROSS-REFERENCE TO RELATED APPLICATIONS

This application is based upon and claims the benefit of priority from the prior Japanese Patent Application No. 2020-157793 filed on Sep. 18, 2020, the entire contents of which are incorporated herein by reference.

FIELD

Embodiments described herein relate generally to an image processing apparatus.

BACKGROUND

Conventionally, systems configured by using many cameras, such as a driving assistance system and a surveillance camera system, have been known.

In a system configured by using many cameras, since image processing such as image development processing needs to be performed on data outputted from each of the many cameras, the number of image processing circuits (image processing processors) increases according to the total number of cameras, and a circuit size increases accordingly. It is therefore conceivable that line pixel data outputted line by line from a plurality of cameras is processed in a time-division manner by, for example, a single image processing circuit, whereby the number of image processing circuits is reduced.

BRIEF DESCRIPTION OF THE DRAWINGS

FIG. 4 is a diagram for describing effects of the first embodiment; and

DETAILED DESCRIPTION

An image processing apparatus in an embodiment includes a FIFO memory, a plurality of line buffers, an image processing circuit, and a control circuit. The plurality of line buffers store data inputted from a plurality of cameras. The image processing circuit performs predetermined image processing on the data stored in the plurality of line buffers. The control circuit performs control, according to an output control signal, such that output of data to the plurality of line buffers is stopped and the data stopped from being outputted is stored in the FIFO memory.

Hereinafter, embodiments will be described in detail with reference to drawings.

First Embodiment

Figure 1:
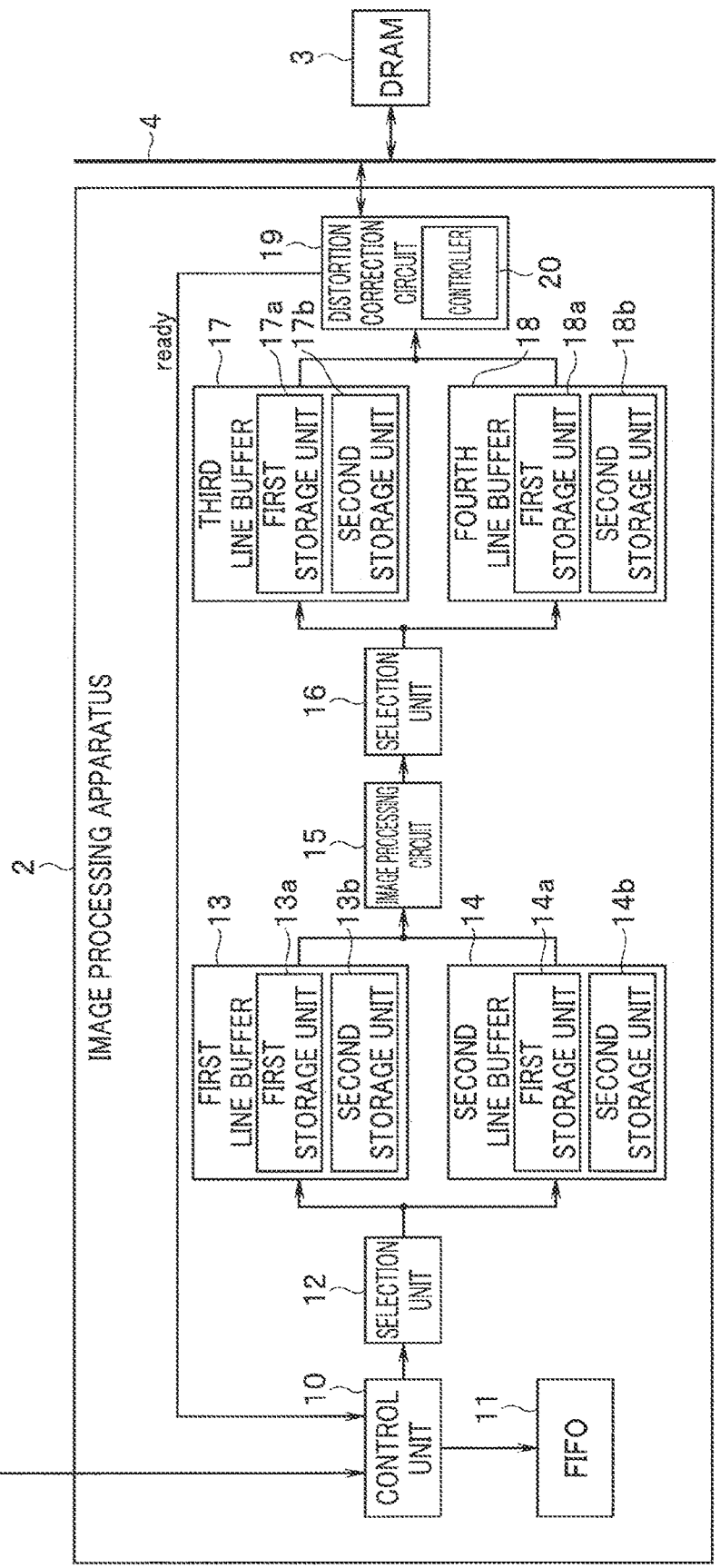
FIG. 1 shows an example of a configuration of an image processing system including an image processing apparatus in a first embodiment.

FIG. 1 shows an example of a configuration of an image processing system including an image processing apparatus in the first embodiment. As shown in FIG. 1, the image processing system 101 includes an imaging unit 1, the image processing apparatus 2, a DRAM 3, and a bus 4.

The imaging unit 1 includes, for example, n (n≥2) cameras CM1, CM2, . . . , CMn that have mutually different angles of view and/or numbers of effective pixels. Note that in a description below, when all, or any one or more, of the cameras CM1, CM2, . . . , CMn are mentioned, the cameras will be referred to as cameras CM or a camera CM.

Each camera CM of the imaging unit 1 includes an image sensor such as a CCD sensor or a CMOS sensor. The imaging unit 1 assigns, to one line of pixel data (line pixel data) acquired by each camera CM, an ID indicating by which camera CM the data is acquired, and outputs the line pixel data respectively assigned the IDs to the image processing apparatus through parallel transmission. Based on an ID assigned to one line of line pixel data, the image processing apparatus 2 can determine from which camera CM, among the plurality of cameras CM, the line pixel data is outputted.

The image processing apparatus 2 accumulates line pixel data outputted line by line from the imaging unit 1, generates frame image data by performing image processing on the accumulated line pixel data, and outputs the generated frame image data to the DRAM 3 through the bus 4.

The image processing apparatus 2 includes a control unit 10, a FIFO 11, a selection unit 12, a first line buffer 13, a second line buffer 14, an image processing circuit 15, a selection unit 16, a third line buffer 17, a fourth line buffer 18, and a distortion correction circuit 19.

The first line buffer 13 includes a first storage unit 13a and a second storage unit 13b. The second line buffer 14 includes a first storage unit 14a and a second storage unit 14b. The third line buffer 17 includes a first storage unit 17a and a second storage unit 17b. The fourth line buffer 18 includes a first storage unit 18a and a second storage unit 18b. The distortion correction circuit 19 includes a controller 20.

The image processing apparatus 2 in the present embodiment has an operating frequency that is twice or more than a rate of input pixels from the imaging unit 1, and is capable of processing, in a time-division manner, a plurality of line pixel data inputted from the imaging unit 1. Note that although a following description will be given on a case where pixel data is inputted into the image processing apparatus 2 from two cameras CM1, CM2, pixel data may be inputted into the image processing apparatus 2 from three or more cameras.

Line pixel data imaged by the cameras CM1, CM2 of the imaging unit 1 is inputted line by line into the control unit 10, together with IDs of the cameras CM1. CM2. The line pixel data imaged by the cameras CM1, CM2 is RAW data that is not subjected to image development processing.

The control unit 10 as a control circuit outputs the inputted line pixel data to the FIFO 11 or the selection unit 12, depending on a ready flag (output control signal), which will be described later. In other words, the control unit 10 performs control of, depending on the ready flag, whether the line pixel data is supplied to the image processing circuit 15 at a subsequent stage, or the line pixel data is stopped from being supplied to the image processing circuit 15 at the subsequent stage and is temporarily stored in the FIFO 11 included in the FIFO memory. When the ready flag is at an L level, the control unit 10 outputs the inputted line pixel data, together with an ID, to the FIFO 11. When the ready flag is at an H level, the control unit 10 outputs the inputted line pixel data to the selection unit 12.

The selection unit 12 outputs line pixel data to the first line buffer 13 or the second line buffer 14, depending on the ID. The selection unit 12 outputs the line pixel data to the first line buffer 13 when the ID indicating the camera CM1 is inputted, and outputs the line pixel data to the second line buffer 14 when the ID indicating the camera CM2 is inputted.

One line of line pixel data from the camera CM1 is stored in each of the first storage unit 13a and the second storage unit 13b of the first line buffer 13. In other words, two lines of line pixel data from the camera CM1 are written on the first line buffer 13.

For example, when line pixel data in a first line from the camera CM1 is inputted into the first line buffer 13, the line pixel data in the first line from the camera CM1 is written onto the first storage unit 13a, and when line pixel data in a second line from the camera CM1 is inputted into the first line buffer 13, the line pixel data in the second line from the camera CM1 is written onto the second storage unit 13b. When line pixel data in a third line from the camera CM1 is inputted into the first line buffer 13, the line pixel data in the third line from the camera CM1 is written onto the first storage unit 13a, and when line pixel data in a fourth line from the camera CM1 is inputted into the first line buffer 13, the line pixel data in the fourth line from the camera CM1 is written onto the second storage unit 13b. In such a manner, line pixel data from the camera CM1 is sequentially written onto the first storage unit 13a and the second storage unit 13b of the first line buffer 13.

Similarly, one line of line pixel data from the camera CM2 is stored in each of the first storage unit 14a and the second storage unit 14b of the second line buffer 14. In other words, two lines of line pixel data from the camera CM2 are written on the second line buffer 14.

For example, when line pixel data in a first line from the camera CM2 is inputted into the second line buffer 14, the line pixel data in the first line from the camera CM2 is written onto the first storage unit 14a, and when line pixel data in a second line from the camera CM2 is inputted into the second line buffer 14, the line pixel data in the second line from the camera CM2 is written onto the second storage unit 14b. When line pixel data in a third line from the camera CM2 is inputted into the second line buffer 14, the line pixel data in the third line from the camera CM2 is written onto the first storage unit 14a, and when line pixel data in a fourth line from the camera CM2 is inputted into the second line buffer 14, the line pixel data in the fourth line from the camera CM2 is written onto the second storage unit 14b. In such a manner, line pixel data from the camera CM2 is sequentially written onto the first storage unit 14a and the second storage unit 14b of the second line buffer 14.

When writing of line pixel data onto at least one storage unit of the first line buffer 13 and the second line buffer 14 is finished, the image processing circuit 15 performs image processing on the written line pixel data. The image processing circuit 15 converts the RAW data from the imaging unit 1 into RGB data and outputs the RGB data to the selection unit 16.

Here, when writing of line pixel data onto respective storage units of the first line buffer 13 and the second line buffer 14 is finished at the same time, the image processing circuit 15 starts image processing in ascending order of image size. Note that the order in which the image processing is started when writing of line pixel data onto respective storage units of the first line buffer 13 and the second line buffer 14 is finished at the same time is not limited to the above-described order, but image processing may be started with, for example, line pixel data from a camera CM whose ID number is smaller.

The selection unit 16 outputs line pixel data from the camera CM1 converted into RGB data to the third line buffer 17, and outputs line pixel data from the camera CM2 converted into RGB data to the fourth line buffer 18.

The line pixel data from the camera CM1 converted into RGB data is sequentially written onto the first storage unit 17a and the second storage unit 17b of the third line buffer 17. The line pixel data from the camera CM2 converted into RGB data is sequentially written onto the first storage unit 18a and the second storage unit 18b of the fourth line buffer 18.

The distortion correction circuit 19 performs distortion correction processing on the line pixel data stored in the third line buffer 17 and the fourth line buffer 18, generates a frame image, and outputs the frame image to the DRAM 3.

The controller 20 monitors the first line buffer 13 and/or the second line buffer 14, and detects whether or not overwriting of line pixel data in each storage unit of the first line buffer 13 and/or the second line buffer 14 occurs before image processing is finished. When the controller 20 detects that overwriting of line pixel data in the first line buffer 13 and/or the second line buffer 14 occurs before image processing is finished, the controller 20 sets the ready flag at the L level and outputs the ready flag to the control unit 10.

When the ready flag at the L level is inputted, the control unit 10 stops supplying line pixel data to the first line buffer 13 and/or the second line buffer 14. The control unit 10 then outputs, to the FIFO 11, the line pixel data and an ID stopped from being supplied, and stores the line pixel data and the ID in the FIFO 11.

Thereafter, when the controller 20 detects that overwriting of the line pixel data in the first line buffer 13 and/or the second line buffer 14 does not occur before image processing is finished, the controller 20 sets the ready flag at the H level and outputs the ready flag to the control unit 10.

When the ready flag at the H level is inputted, the control unit 10 resumes supplying line pixel data to the first line buffer 13 and/or the second line buffer 14 by reading the line pixel data from the FIFO 11 in a first in, first out manner and outputting the line pixel data to the selection unit 12.

Next, operation of the image processing apparatus in the present embodiment will be described with reference to FIGS. 2 and 3.

Figure 2:
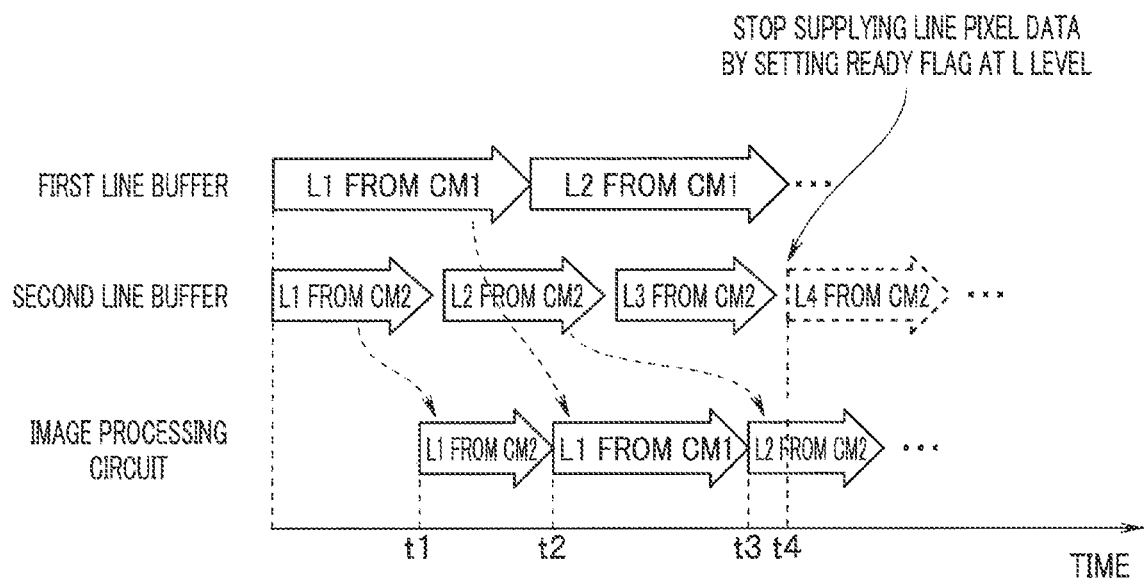
FIG. 2 shows operation when overwriting of a line buffer occurs before image processing is finished.

FIG. 2 shows operation when overwriting of a line buffer occurs before image processing is finished. FIG. 3 shows operation when overwriting of a line buffer does not occur before image processing is finished.

The camera CM1 and the camera CM2 have different numbers of pixels in one line, due to differences in angle of view (narrow angle, wide angle), pixel count (2K, 4K), and the like. In the present embodiment, a description will be given, assuming that the number of pixels in one line of the camera CM1 is approximately twice the number of pixels in one line of the camera CM2. For example, the number of pixels in one line of the camera CM1 is 4000 pixels, and the number of pixels in one line of the camera CM2 is 2000 pixels.

Line pixel data L1, L2, L3, L4, . . . from the camera CM1 are inputted into the first line buffer 13, and line pixel data L1, L2, L3, L4, . . . from the camera CM2 are inputted into the second line buffer 14.

First, the line pixel data L1 from the camera CM1 is written onto the first storage unit 13a of the first line buffer 13, and the line pixel data L2 from the camera CM1 is written onto the second storage unit 13b of the first line buffer 13.

Thereafter, when the line pixel data L3 from the camera CM1 is inputted into the first line buffer 13, the first storage unit 13a of the first line buffer 13 is overwritten with the line pixel data L3 from the camera CM1. When the line pixel data L4 from the camera CM1 is inputted into the first line buffer 13, the second storage unit 13b of the first line buffer 13 is overwritten with the line pixel data L4 from the camera CM1.

On the other hand, the line pixel data L1 from the camera CM2 is written onto the first storage unit 14a of the second line buffer 14, and the line pixel data l2 from the camera CM2 is written onto the second storage unit 14b of the second line buffer 14.

Thereafter, when the line pixel data L3 from the camera CM2 is inputted into the second line buffer 14, the first storage unit 14a of the second line buffer 14 is overwritten with the line pixel data L3 from the camera CM2. When the line pixel data IA from the camera CM2 is inputted into the second line buffer 14, the second storage unit 14b of the second line buffer 14 is overwritten with the line pixel data L4 from the camera CM2.

The image processing circuit 15 starts image processing of the line pixel data L in the order in which writing of the line pixel data L is finished. In the example in FIG. 2, since writing of the line pixel data L1 onto the first storage unit 14a of the second line buffer 14 is first finished, the image processing circuit 15 starts image processing, at a time point t1, on the line pixel data L1 written on the first storage unit 14a of the second line buffer 14.

Next, writing of the line pixel data L1 onto the first storage unit 13a of the first line buffer 13 is finished. When the image processing of the line pixel data L1 written on the first storage unit 14a of the second line buffer 14 is finished, the image processing circuit 15 starts image processing, at a time point t2, on the line pixel data L1 written on the first storage unit 13a of the first line buffer 13.

Next, writing of the line pixel data L2 onto the second storage unit 14b of the second line buffer 14 is finished. When the image processing of the line pixel data L1 written on the first storage unit 13a of the first line buffer 13 is finished, the image processing circuit 15 starts image processing, at a time point t3, on the line pixel data L2 written on the second storage unit 14b of the second line buffer 14.

Here, writing of the line pixel data L4 onto the second storage unit 14b of the second line buffer 14 is started at a time point t4. As a result, before the image processing circuit 15 finishes the image processing of the line pixel data L2 stored in the second storage unit 14b of the second line buffer 14, writing of the new line pixel data L4 onto the second storage unit 14b is started. In such a case, it is highly probable that the image processing currently performed by the image processing circuit 15 is not normally finished.

Accordingly, the controller 20 causes the supply of the line pixel data L4 from the camera CM2 to be stopped, by setting the ready flag at the L level. When the ready flag at the L level is inputted, the control unit 10 outputs the line pixel data L4 from the camera CM2 to the FIFO 11 and temporarily stores the line pixel data L4 from the camera CM2 in the FIFO 11.

Figure 3:
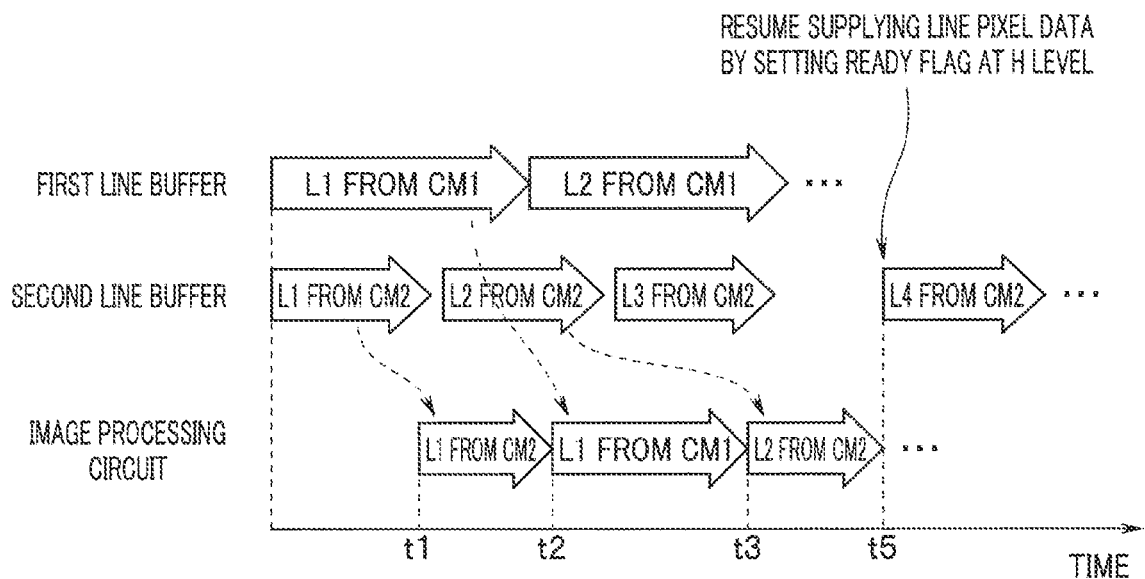
FIG. 3 shows operation when overwriting of a line buffer does not occur before image processing is finished.

As shown in FIG. 3, when the image processing circuit 15 finishes the image processing of the line pixel data L2 from the camera CM2, the controller 20 detects that overwriting of the line pixel data does not occur. The controller 20 causes the supply of the line pixel data L4 from the camera CM2 to be resumed, by setting the ready flag at the H level. When the ready flag at the H level is inputted, the control unit 10 reads from the FIFO 1l the line pixel data L4 from the camera CM2 and supplies the line pixel data L4 from the camera CM2 to the second line buffer 14 via the selection unit 12.

Through the above-described processing, writing of the new line pixel data L4 onto the second storage unit 14b of the second line buffer 14 is started at a time point t5 after the image processing circuit 15 finishes the image processing of the line pixel data L2 in the second storage unit 14b of the second line buffer 14.

As a result, according to the image processing apparatus 2 in the present embodiment, the line pixel data in the first line buffer 13 and/or the second line buffer 14 is prevented from being overwritten before the image processing is finished.

FIG. 4 is a diagram for describing the effects of the first embodiment.

A comparison example shows a case where two image processing circuits are required when image processing is performed on image data from two cameras CM in a non-time-division manner. Note that FIG. 4 shows ratios between the number of image processing circuits, a logic circuit area, a memory capacity, a chip area, and power consumption in the comparison example (non-time division) and the number of image processing circuits, a logic circuit area, a memory capacity, a chip area, and power consumption in the present embodiment (time division).

In the present embodiment, the image data from the two cameras CM1, CM2 are inputted in a time-division manner and image processing is performed line by line in a time-division manner by the single image processing circuit 15. For example, a driving assistance system includes at least four cameras, including a front camera for taking an image in front of a vehicle, a back camera for taking an image behind the vehicle, a left side camera for taking an image on a left side of the vehicle, and a right side camera for taking an image on a right side of the vehicle. In the present embodiment, even when the four cameras are included, two image processing circuits suffice.

Accordingly, the number of image processing circuits in the present embodiment (time division) can be reduced to 50% of the number of image processing circuits in the comparison example (non-time division). The logic circuit area in the present embodiment can be reduced accordingly to 50% of the logic circuit area in the comparison example. Although there is no difference in memory capacity between the present embodiment and the comparison example, the chip area in the present embodiment can be reduced to approximately 81% of the chip area in the comparison example, according to the reduction in the logic circuit area. Moreover, the power consumption in the present embodiment can be reduced to 83% of the power consumption in the comparison example, according to the reduction in the logic circuit area.

As a result, according to the present embodiment, the chip area can be reduced by approximately 19% compared to the comparison example, and the power consumption can be reduced by approximately 17% compared to the comparison example.

Second Embodiment

Next, a second embodiment will be described.

In the first embodiment, line pixel data is concurrently inputted into the image processing apparatus 2 from the plurality of cameras CM of the imaging unit 1. In the second embodiment, line pixel data is sequentially inputted into an image processing apparatus 2 from the plurality of cameras CM of the imaging unit 1. Although the configuration of the image processing apparatus 2 in the second embodiment is similar to that in the first embodiment, a specification of output of line pixel data from the imaging unit 1 is different from that in the first embodiment.

Figure 5:
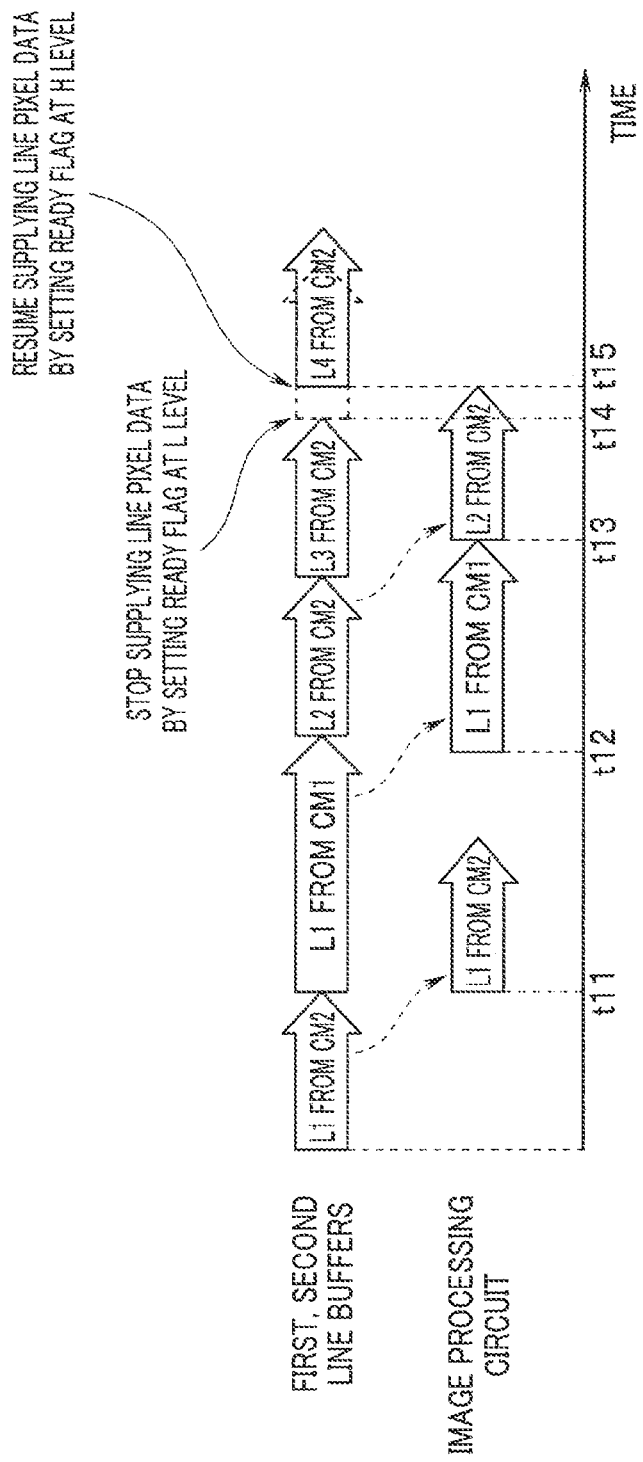
FIG. 5 is a diagram for describing operation in a second embodiment.

FIG. 5 is a diagram for describing operation in the second embodiment.

The line pixel data imaged by the cameras CM1 and CM2 of the imaging unit 1 are sequentially inputted into the image processing apparatus 2. As in the first embodiment, the line pixel data L1, L2, L3, L4, . . . from the camera CM1 are inputted into the first line buffer 13, and the line pixel data L1, L2, L3, L4, . . . from the camera CM2 are inputted into the second line buffer 14.

The line pixel data L1, L2, L3, L4, . . . from the camera CM1 are sequentially stored in the first storage unit 13a and the second storage unit 13b of the first line buffer 13. On the other hand, the line pixel data L1, L2, L3, L4, . . . from the camera CM2 are sequentially stored in the first storage unit 14a and the second storage unit 14b of the second line buffer 14.

The line pixel data are sequentially inputted into the control unit 10 in the following order of the line pixel data L1 from the camera CM2, the line pixel data L1 from the camera CM1, the line pixel data L2 from the camera CM2, the line pixel data L3 from the camera CM2, the line pixel data IA from the camera CM2.

Accordingly, as shown in FIG. 5, the line pixel data L1 from the camera CM2 is written onto the first storage unit 14a of the second line buffer 14. Next, the line pixel data L1 from the camera CM1 is written onto the first storage unit 13a of the first line buffer 13, and the line pixel data L2 from the camera CM2 is written onto the second storage unit 14b of the second line buffer 14.

Thereafter, the line pixel data L3 from the camera CM2 is written (overwritten) onto the first storage unit 14a of the second line buffer 14, and the line pixel data L4 from the camera CM2 is written (overwritten) onto the second storage unit 14b of the second line buffer 14.

When writing of the line pixel data L1 from the camera CM2 onto the first storage unit 14a of the second line buffer 14 is finished, the image processing circuit 15 starts image processing, at a time point t11, on the line pixel data L1 from the camera CM2.

Next, when writing of the line pixel data L1 from the camera CM1 onto the first storage unit 13a of the first line buffer 13 is finished, the image processing circuit 15 starts image processing, at a time point t12, on the line pixel data L1 from the camera CM1.

By a time point when the image processing of the line pixel data L1 from the camera CM1 is finished, writing of the line pixel data L2 from the camera CM2 onto the second storage unit 14b of the second line buffer 14 has been finished. Accordingly, when the image processing of the line pixel data L1 from the camera CM1 is finished, the image processing circuit 15 starts image processing, at a time point t13, on the line pixel data L2 from the camera CM2.

Here, writing of the line pixel data L4 onto the second storage unit 14b of the second line buffer 14 is started at a time point t14. As a result, before the image processing circuit 15 finishes the image processing of the line pixel data L2 stored in the second storage unit 14b of the second line buffer 14, writing of the new line pixel data L4 onto the second storage unit 14b is started. In such a case, it is highly probable that the image processing currently performed by the image processing circuit 15 is not normally finished.

Accordingly, the controller 20 causes supply of the line pixel data L4 from the camera CM2 to be stopped, by setting the ready flag at the L level. When the ready flag at the L level is inputted, the control unit 10 outputs the line pixel data L4 from the camera CM2 to the FIFO 11 and temporarily stores the line pixel data IA from the camera CM2 in the FIFO 11.

When the image processing circuit 15 finishes the image processing of the line pixel data L2 from the camera CM2, the controller 20 causes the supply of the line pixel data IA from the camera CM2 to be resumed, by setting the ready flag at the 1H level. When the ready flag at the H level is inputted, the control unit 10 reads from the FIFO 11 the line pixel data L4 from the camera CM2 and supplies the line pixel data L4 from the camera CM2 to the second line buffer 14 via the selection unit 12.

Through the above-described processing, writing of the new line pixel data L4 onto the second storage unit 14b of the second line buffer 14 is started at a time point t15 after the image processing circuit 15 finishes the image processing of the line pixel data L2 in the second storage unit 14b of the second line buffer 14.

As a result, according to the image processing apparatus 2 in the present embodiment, as in the first embodiment, the line pixel data in the first line buffer 13 and/or the second line buffer 14 is prevented from being overwritten before image processing is finished.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

The invention claimed is:

1. An image processing apparatus for connecting to an imaging unit including a plurality of cameras, the image processing apparatus comprising:
    a FIFO memory;
    a plurality of line buffers configured to store data inputted from the plurality of cameras each having the different number of pixels in one line;
    an image processing circuit that performs predetermined image processing on the data stored in the plurality of line buffers;
    a controller that detects whether or not overwriting of the data in at least one of the plurality of line buffers occurs before the predetermined image processing is finished, and outputs an output control signal according to a result of the detection; and
    a control circuit that performs control, according to the output control signal, such that output of the data to the plurality of line buffers is stopped and the data stopped from being outputted is stored in the FIFO memory,
    wherein the image processing apparatus has an operating frequency that is twice or more than a rate of input pixels from the imaging unit.

2. The image processing apparatus according to claim 1, further comprising a distortion correction circuit that performs distortion correction of the data on which the predetermined image processing is performed by the image processing circuit.

3. The image processing apparatus according to claim 1, wherein the data inputted from the plurality of cameras is line pixel data in a unit of a line.

4. The image processing apparatus according to claim 1, wherein the data inputted from the plurality of cameras is concurrently inputted into the control circuit.

5. The image processing apparatus according to claim 1, wherein the data inputted from the plurality of cameras is sequentially inputted into the control circuit.

6. The image processing apparatus according to claim 1, wherein
the data inputted from the plurality of cameras is RAW data, and
the image processing circuit converts the RAW data into RGB data.

7. The image processing apparatus according to claim 1, wherein the data is assigned an ID indicating by which camera, among the plurality of cameras, the data is acquired.

8. The image processing apparatus according to claim 1, wherein the image processing apparatus has an operating frequency that is twice or more than a rate of input pixels from the plurality of cameras, and processes, in a time-division manner, the data inputted from the plurality of cameras.

9. The image processing apparatus according to claim 1, wherein
when the controller detects that the overwriting of the data occurs before the predetermined image processing is finished, the controller outputs to the control circuit the output control signal for storing the data in the FIFO memory, and
when the controller detects that the overwriting of the data does not occur before the predetermined image processing is finished, the controller outputs to the control circuit the output control signal for storing the data in the plurality of line buffers.

* * * * *